United States Patent
Perlman et al.

(10) Patent No.: US 6,182,491 B1
(45) Date of Patent: Feb. 6, 2001

(54) TOOL MOUNT FOR AUTOMATED MANUFACTURING LINES

(75) Inventors: Maurice Perlman, Oak Park; Don Hufford, Farmington Hills, both of MI (US)

(73) Assignee: CPI Products, L.C., Plymouth Township, MI (US)

(*) Notice: Under 35 U.S.C. 154(b), the term of this patent shall be extended for 0 days.

(21) Appl. No.: 09/439,601

(22) Filed: Nov. 12, 1999

(51) Int. Cl.$^7$ .................. B21D 43/05; F16B 2/00
(52) U.S. Cl. .................. 72/405.09; 72/405.01; 403/381
(58) Field of Search .................. 72/405.11, 405.13, 72/405.16, 405.01, 405.09; 403/381; 470/95, 109, 154

(56) References Cited

U.S. PATENT DOCUMENTS

| | | |
|---|---|---|
| 959,854 | 5/1910 | Grierson. |
| 3,402,954 | 9/1968 | Simon. |
| 4,019,298 | 4/1977 | Johnson, IV ............ 403/381 |
| 4,090,796 | * 5/1978 | Okuda .................. 403/381 |
| 4,557,134 | * 12/1985 | Kuppinger ............. 27/419 |
| 4,564,732 | 1/1986 | Lancaster et al. ....... 403/381 |
| 4,586,364 | * 5/1986 | Berger ................. 72/405.11 |
| 4,605,340 | 8/1986 | Stephan ................ 403/381 |
| 4,684,285 | 8/1987 | Cable .................. 403/331 |
| 4,867,598 | 9/1989 | Winter, IV ............ 403/381 |
| 4,881,398 | * 11/1989 | Daubner ............... 72/419 |
| 5,083,331 | 1/1992 | Schnelle et al. ........ 403/331 |
| 5,244,300 | 9/1993 | Pierreira et al. ....... 403/381 |
| 5,406,767 | 4/1995 | Pech et al. ........... 403/381 |
| 5,664,793 | 9/1997 | Engibarov ............. 403/381 |
| 5,782,571 | 7/1998 | Hufford et al. ........ 403/322 |
| 5,913,781 | 6/1999 | Vidmar et al. ......... 403/381 |

FOREIGN PATENT DOCUMENTS

3634756 A1 * 6/1987 (DE) ............. 72/405.01

OTHER PUBLICATIONS

Exhibit A is an information packet describing a Ford Motor Company transfer die that was in public use more than one year prior to the filing date of this application.

Exhibit B is an information packet describing a receiver housing and insert that were in public use more than one year prior to the filing date of this application.

Exhibit C is an excerpt of a 1998 catalog describing Atlas Technologies transfer press tooling.

Exhibit D is an excerpt from a brochure illustrating the assignee's transfer press housing and bayonet which were on sale or in public use more than one year prior to the filing date of this application.

Exhibit E is an information packet describing a Syron Engineering & mfg. transfer tooling system that was on sale or in public use for more than one year prior to the filing date of this application.

* cited by examiner

Primary Examiner—Daniel C. Crane
(74) Attorney, Agent, or Firm—Van Dyke, Gardner, Linn & Burkhart, LLP

(57) ABSTRACT

A tool mount for mounting tool assemblies on a transfer press, or other type of automated assembly line, includes a bayonet which can be selectively inserted into a receiver mounted on the transfer press rail. The receiver includes a generally tapered channel which receives a tapered portion of the bayonet. The receiver and the bayonet thereby form a dove tail type of junction. The direction of taper is oriented such that the bayonet must be inserted from the back end of the receiver and pushed forwardly to secure it therein. A lock selectively secures the bayonet within the receiver. The lock includes a latch that engages a first cam surface to push the bayonet inwardly into the receiver and thereby prevent it from being removed, while simultaneously insuring a tight fit between the receiver and the bayonet. The lock latch further engages a second cam surface of the bayonet when the bayonet is to be removed from the receiver. The latch engagement with the second cam surface helps push the bayonet at least partially out of the channel of the receiver.

29 Claims, 7 Drawing Sheets

TOOL MOUNT FOR AUTOMATED MANUFACTURING LINES

BACKGROUND OF THE INVENTION

This invention generally relates to automated assembly and manufacturing, and more particularly to tool mounts for holding tools on various moving components, such as transfer press rails, which are part of the manufacturing line.

A common part of an assembly line is a transfer press. The transfer press is used for moving parts in and out of dies. The transfer press includes a rail that is movable in several directions. One or more tools are mounted to the transfer press rail by way of a tool mount and are used to handle the parts being manufactured or assembled. These tools may include suction cups, fingers, shovels, grippers, or the like, for selectively engaging the part that is being manufactured or assembled.

The arrangement or configuration of the tools is usually specifically tailored for the part being manufactured. If a different part is to be manufactured along the same transfer press assembly line, the tools are typically replaced with a set of differently configured tools. The removal and replacement of the old set of tools is facilitated by the tool mount attached to the transfer press rail. The tool mount typically receives a boom to which the various tools are mounted. By removing the boom from the tool mount, all of the tools associated with that mount can be quickly and easily removed. A new boom, having a new arrangement of possibly different tools, can then be inserted into the tool mount and secured therein for use with the different part being manufactured.

In the past, there have been several problems with prior art tool mounts. One of these problems has had to do with the tightness with which the tool mount secures the boom and tools to the transfer press rail. If the tools and boom are not secured tightly to the tool mount, the tools can end up with a certain degree of free play or wiggle room with respect to the tool mount. This can cause problems with the precise alignment of the tools and the part being manufactured, and is desirably avoided.

A second problem with the prior art tool mounts is the ease with which the tools and boom can be removed from the transfer press rail. In most manufacturing environments, it is desirable to change the tooling on the transfer press assembly line as easily as possible. In the past, the tool assembly has always been removed from the transfer press rail by moving the tool assembly out of the forward end of the tool mount. This can be a difficult task because the person changing the tool assembly is usually positioned behind the transfer press rail. The person therefore has to push the tool assembly away from himself or herself to remove it from the tool mount, and then must lift and pull it toward himself or herself in order to remove it from the transfer press. Also, there can be insufficient space between the die and tool assembly to push the tool assembly out far enough to disengage it from the tool mount, making it impossible to remove the tool until the die has been removed. In addition, the height of the transfer press rail can often be as high as five feet or more at the time the tool assembly is to be changed. Such heights can make it especially difficult for shorter people to push the tool assembly out of the receiver and then pull the assembly forward to remove it from the transfer press rail. The need for an improved tool mount which has both an improved tightness and ease of assembly and disassembly can therefore be seen.

SUMMARY OF THE INVENTION

A transfer press tool mounting system according to one embodiment of the present invention includes a bayonet that has an opening for selectively receiving a boom. The boom is adapted to support one or more tools that are used to manipulate items being pressed by the transfer press. The tool mounting system further includes a receiver that has a front end and a back end. The receiver defines a channel for selectively receiving the bayonet. The channel has a width that decreases from either the back end to the forward end or from the forward end to the back end of the channel. The receiver is mounted to a transfer press rail, and the tool mounting system further includes a lock attached to either the bayonet or the receiver. The lock is movable between a locking and an unlocking position. In the locking position, the bayonet cannot be removed from the receiver, while in the unlocking position, the bayonet can be removed from the receiver.

In another embodiment of the present invention, a tool mount comprises a bayonet having a front end in which an opening is defined for selectively receiving a boom. The boom is adapted to support one or more tools that are used to manipulate items being pressed by the transfer press. The boom supports the tools in front of the bayonet. A receiver is provided that has a forward end and a back end. The receiver defines a channel for selectively receiving the bayonet. The receiver includes at least one wall which prevents the bayonet from being inserted into the forward end of the channel such that the front of the bayonet must be inserted into the back end of the channel in order to secure the bayonet to the receiver. The bayonet is thereby moved toward the back end of the receiver when the bayonet is to be removed from the receiver. The tool mount further includes a lock attached to either the bayonet or the receiver. The lock is movable between an unlocking position and a locking position. In the locking position, the bayonet cannot be removed from the receiver. In the unlocking position, the bayonet can be removed from the receiver.

According to another embodiment in the present invention, a transfer press tool mount is provided having a bayonet that includes an opening for selectively receiving a boom. A receiver is included that has at least two spaced sidewalls and a bottom plate. The spaced sidewalls and the bottom plate define, in combination, a channel for selectively receiving the bayonet. A lock is attached to the receiver and selectively prevents the bayonet from being removed from the receiver. The lock includes a latch attached to a shaft such that the latch selectively extends into the channel from the bottom plate when the shaft is rotated.

In various other embodiments, the tool mount may include one or more air passageways in the receiver and the bayonet which are in communication when the bayonet is inserted into the channel of the receiver. An electrical connector may also be mounted on the receiver and bayonet such that they are electrically coupled together when the bayonet is inserted into the channel of the receiver. In still other embodiments, the two sidewalls may extend upwardly from the bottom plate at an angle toward each other to thereby form a dovetail type of shape.

The tool mount of the present invention improves the ease of mounting and dismounting tool assemblies from the rail of a transfer press. The tapering width of the channel in the receiver provides for a generally tighter fit between the bayonet and receiver than prior art tool mounts. The channel of the receiver is also designed such that the bayonet must be inserted from the rear end of the receiver. Removal of the bayonet and attached tool assembly therefore can be accomplished by simply pulling the bayonet and tool assembly toward the user in one single motion. These and other benefits, results, and objects of the present invention will be apparent to one skilled in the art, in light of the following specification when read in conjunction with the accompanying drawings.

DESCRIPTION OF THE PREFERRED EMBODIMENTS

Figure 11:
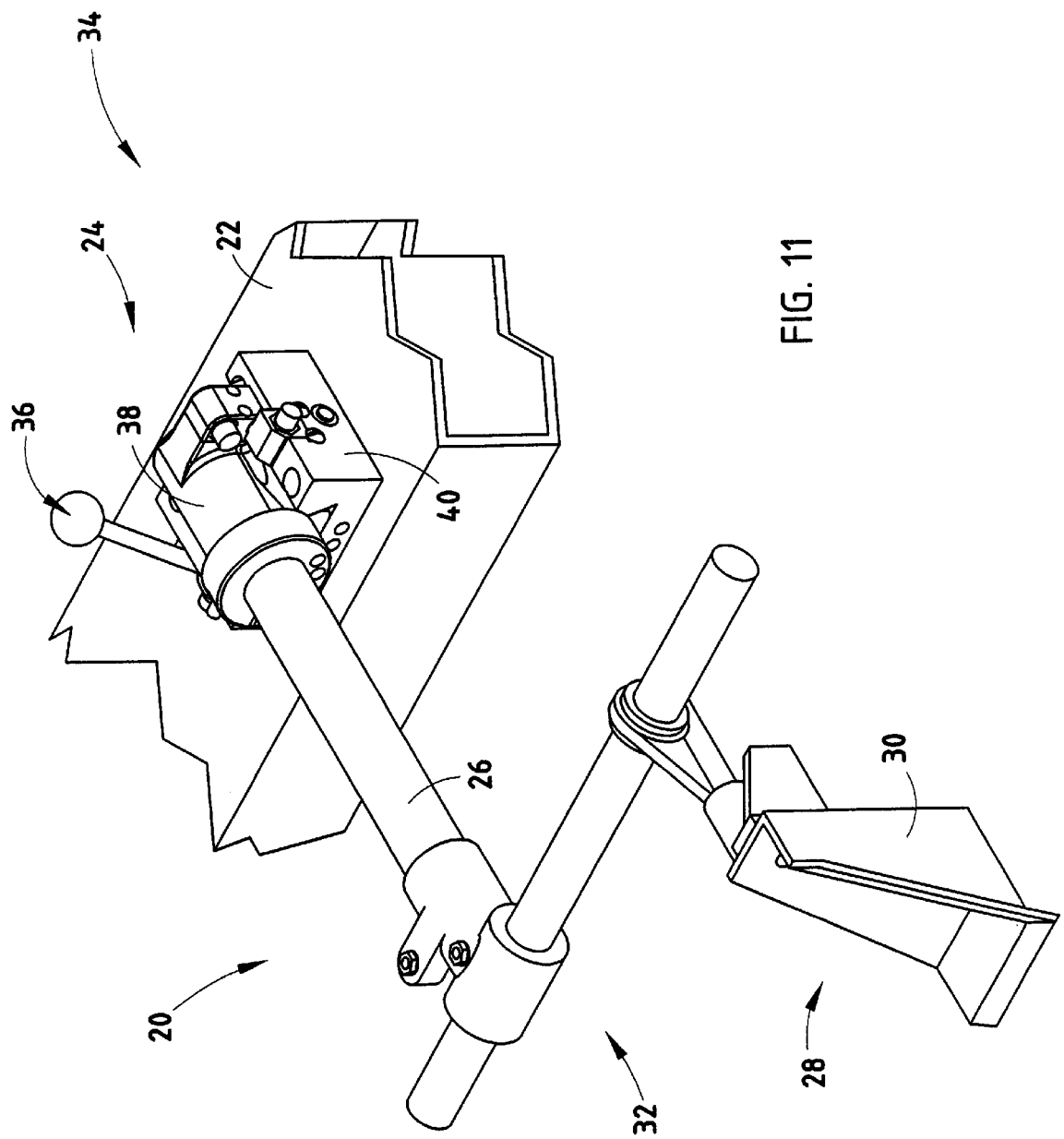
FIG. 11 is a partial, exploded view of a tool mounting assembly that includes a tool mount, a boom, a tool, and a section of a transfer press rail.

The present invention will now be described with reference to the accompanying drawings wherein like reference numerals correspond to like elements in the several drawings. A tool mounting system 20 according to one embodiment of the present invention is depicted in FIG. 11. The tool mounting system 20 includes a transfer press rail 22 to which a tool mount 24 is attached. A boom 26 extends forwardly from tool mount 24 and supports a tool 28. In the illustrated embodiment, the tool 28 comprises a shovel bracket which can be used for supporting various types of items undergoing manufacture. The tool mount 24 comprises a bayonet 38 and a receiver 40. The tool mount 24 allows boom 26 and tool 28 to be easily removed from transfer press rail 22 by removing bayonet 38 from receiver 40. The removal is accomplished by moving a handle 36 forward toward a front end 32. Bayonet 38 is then pulled in a rearward direction toward a back end 34 and out of receiver 40. Because boom 26 and tool 28 are mounted to bayonet 38, the boom and tool assembly is removed from the transfer press rail 22 when bayonet 38 has been removed from receiver 40. Removal of the tool assembly and bayonet 38 is therefore accomplished by a single rearward motion towards back end 34.

Figure 1:
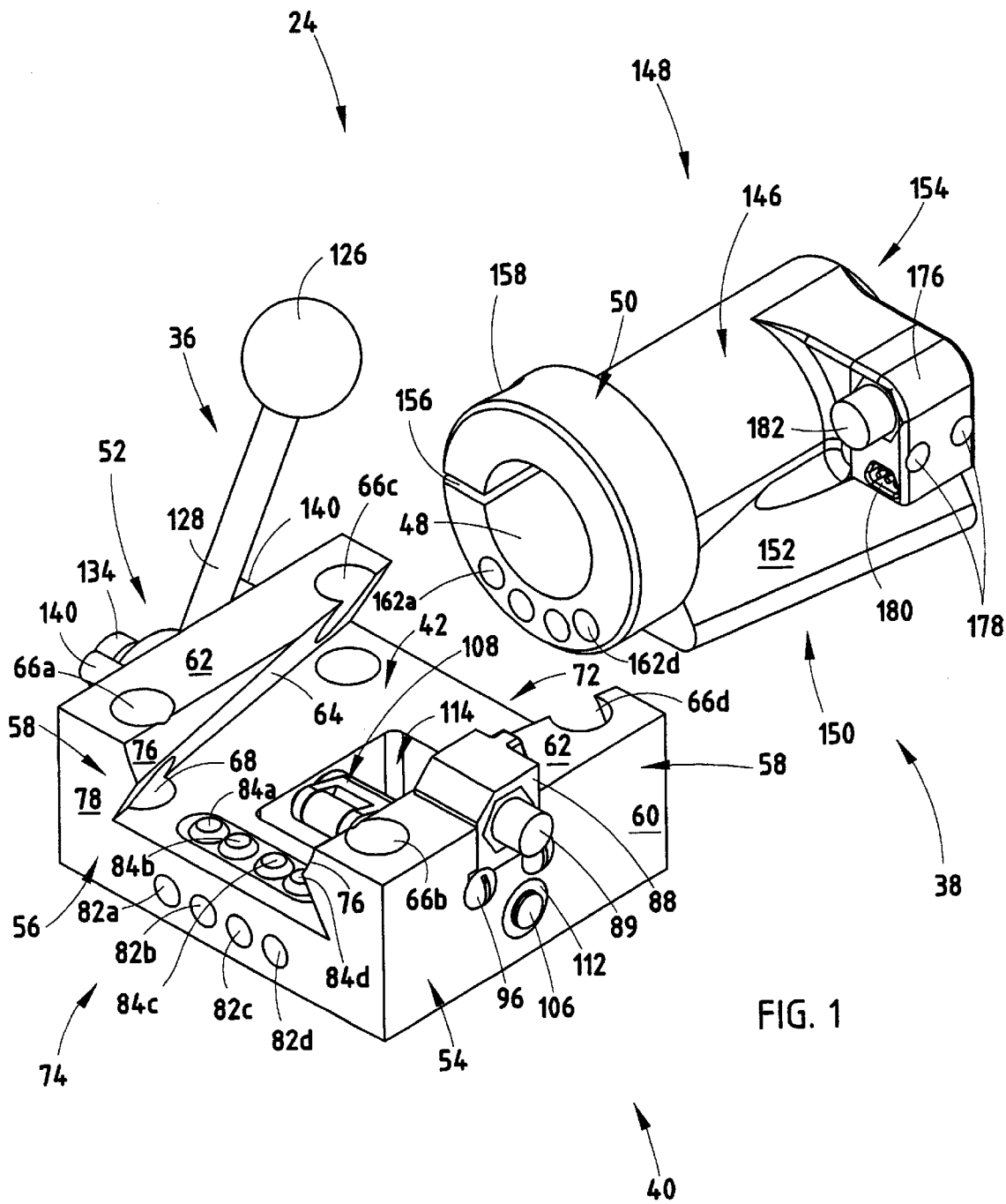
FIG. 1 is a perspective view of one embodiment of a tool mount comprising a receiver and a bayonet.
Figure 2:
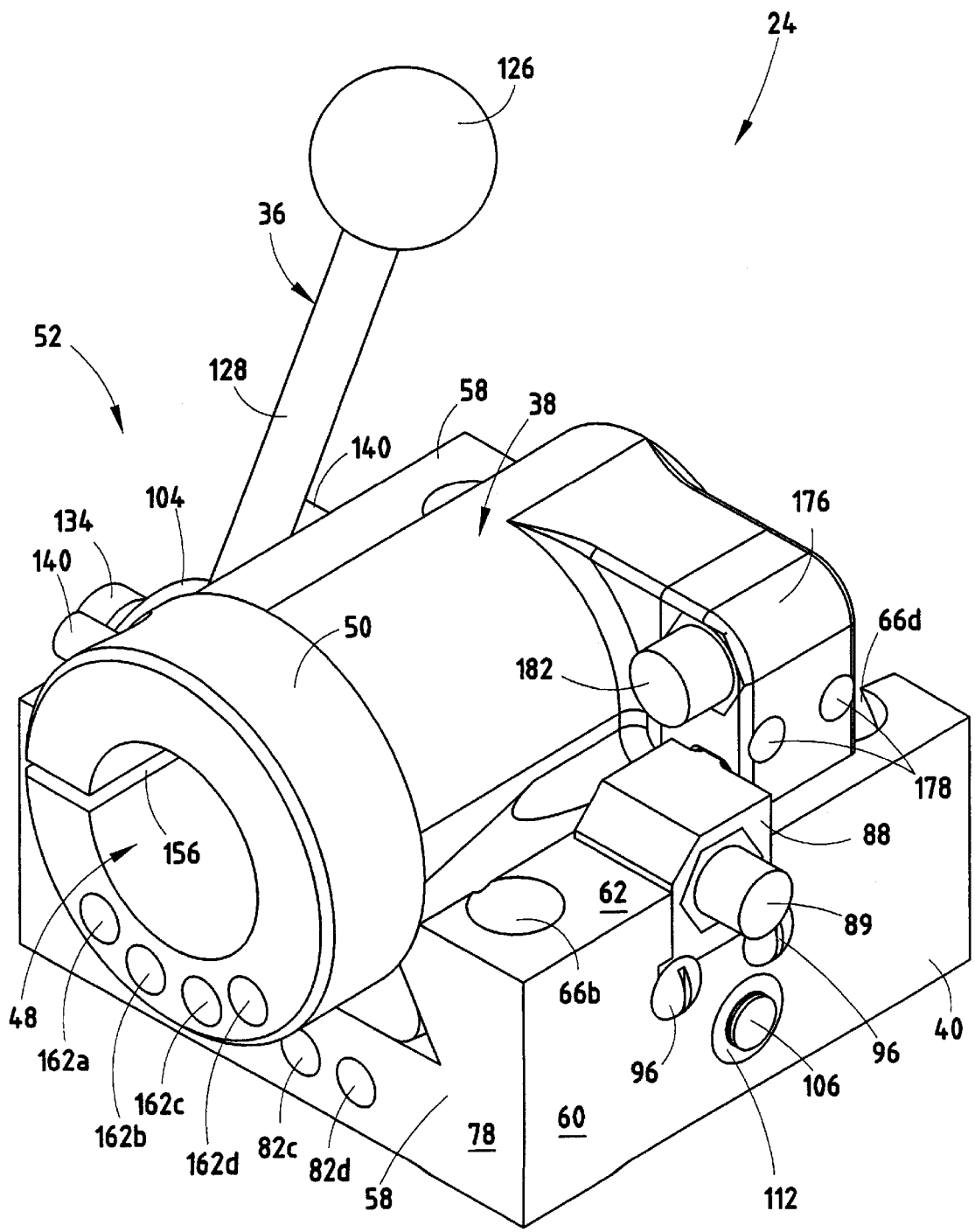
FIG. 2 is a perspective view of the bayonet and receiver of FIG. 1 shown connected together.

FIG. 1 illustrates bayonet 38 and receiver 40 when they are separated from each other. Receiver 40 includes a channel 42 which selectively receives bayonet 38. Bayonet 38 includes a cylindrical bore 48 into which boom 26 is selectively inserted. Boom 26 is secured in bore 48 by tightening a head portion 50 of bayonet 38 as described in more detail herein. Bayonet 38 is secured in channel 42 of receiver 40 by a lock 52, which is also described in more detail herein.

Figure 3:
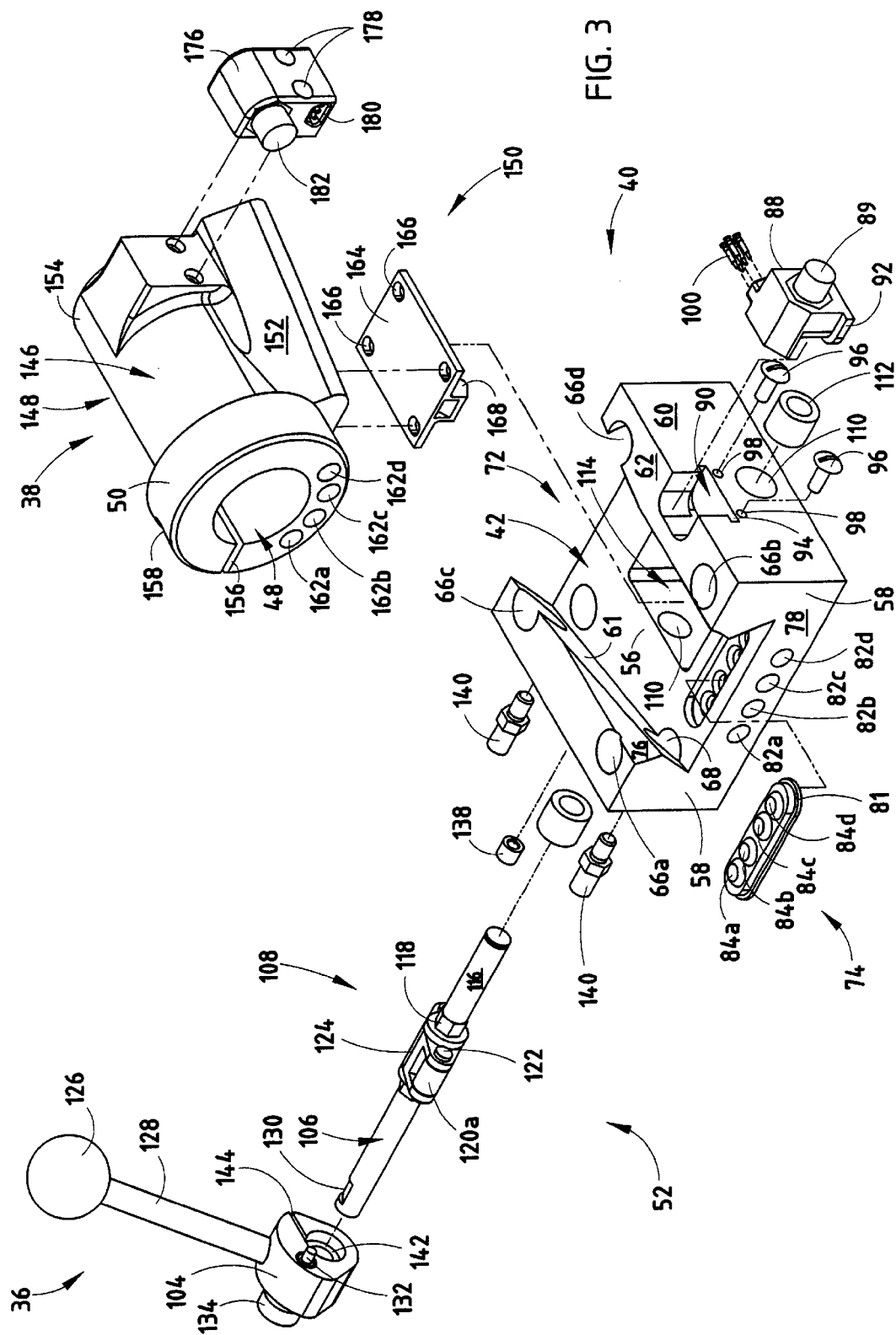
FIG. 3 is a perspective, exploded view of the bayonet and receiver.
Figure 6:
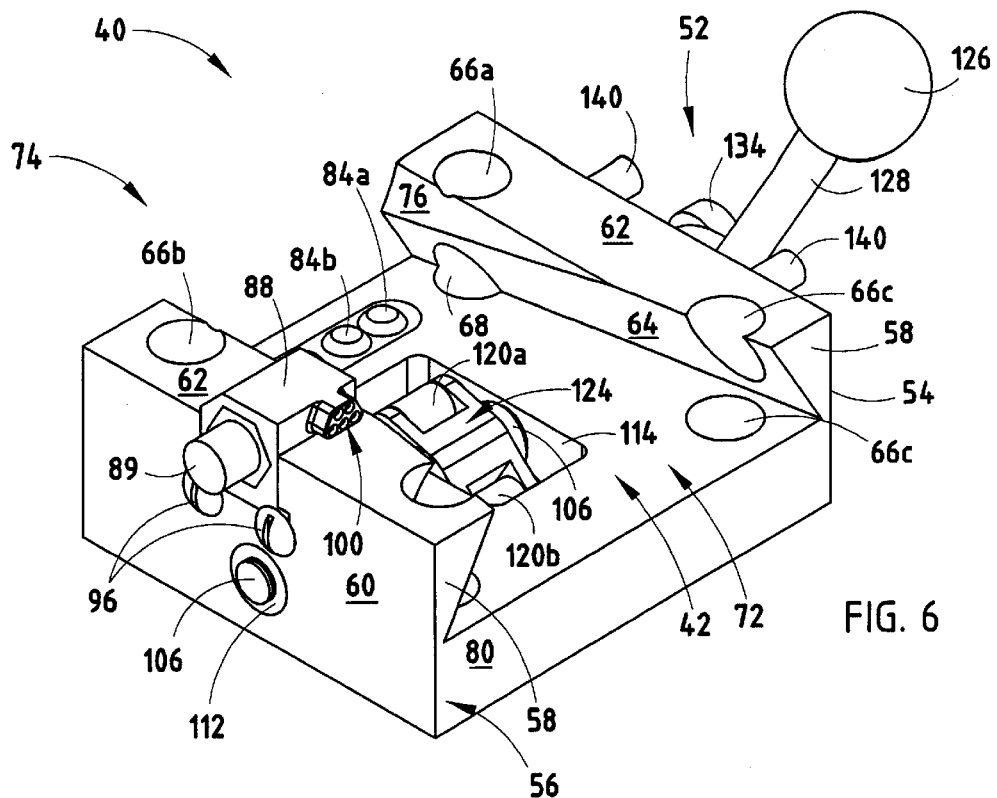
FIG. 6 is a rear, perspective view of the receiver.

Receiver 40 generally includes a body 54 comprising a bottom plate 56 and a pair of sidewalls 58 (FIGS. 1, 3, and 6–7). Sidewalls 58 each include an outside surface 60, a top 62, and an inside surface 64. Four mounting holes 66a–d are defined in sidewalls 58 and extend vertically downward from top 62 to the bottom of receiver 40. As can be seen in FIGS. 1, 3, and 6, front holes 66a and b extend downwardly from top 62 and define an opening 68 along the inside surface 64 of sidewalls 58. Mounting holes 66a–d each receive a fastener (not shown), such as a bolt, a screw, or the like, which is used to secure receiver 40 to transfer press rail 22. The upper portion of mounting holes 66 have a larger diameter than the lower portion of mounting hole 66. This difference in diameter creates a ledge or shoulder 70 (FIG. 7) which abuts against the head of the bolt, screw, or other fastener that is used to secure receiver 40 to the transfer press rail The channel 42 of receiver 40 is generally defined by bottom plate 56 and inside surfaces 64 of sidewalls 58 (FIGS. 1, 3, and 6). Channel 42 includes a back end 72 and a front end 74. The width of channel 42 between inside surfaces 64 of sidewalls 58 decreases from back end 72 toward front end 74. In other words, the width of channel 42 and back end 72 is greater than the width of channel 42 at front end 74. In this sense, channel 42 is tapered inwardly from back to front. Inside surfaces 64 of sidewalls 58 extend upwardly from bottom plate 56 at an angle. This angled extension generally gives channel 42 a dovetail type of shape. The angle of inside surfaces 64 with respect to bottom plate 56 is constant from back end 72 to front end 74 of channel 42 in the current embodiment. Also, in the current embodiment, the angle between bottom plate 56 and inside surfaces 64 is between 20° and 40°. It will be understood, of course, that a variety of different sized angles can be used within the scope of the invention. The key factor in choosing the size of the angle is to ensure that it is sufficient enough to prevent the back end of bayonet 44 from tilting upward due to the weight of boom 26 and the tools 28 mounted thereon when bayonet 38 is not latched in place. If the angle is too small, such tilting may take place. Inside surfaces 64 of sidewalls 58 also each include a partial, cylindrical surface 76 which is designed to allow clearance for head portion 50 of bayonet 38 when bayonet 38 is inserted into receiver 40.

Body 54 of receiver 40 includes a front surface 78 and back surface 80 (FIGS. 1, 3, and 6). Front surface 78 includes a plurality of air inlet holes 82a–d defined therein. Air inlet holes 82a–d are designed to allow up to four sources of pressurized air to be delivered through receiver 40 to bayonet 38 and eventually to whatever tools 28 that require pressurized air. The air inlet holes 82a–d define the opening of air passageways that extend into body 54 of receiver 40 and angle upwardly toward bottom plate 56. A plurality of air outlet holes 84a–d are defined in bottom plate 56 of receiver 40 and are in communication with air inlet holes 82a–d defined in front surface 78. Pressurized air forced into air inlet hole 82a will therefore exit out of air outlet hole 84a. Pressurized air supplied to air inlet holes 82a will likewise be communicated to each of air outlet holes 84b–d, respectively. Each of air outlet holes 84a–d are defined in a location on bottom plate 56 such that they will be aligned with corresponding air holes defined on the underside of bayonet 38, as described more fully herein. The plurality of air holes thereby allows pressurized air to be communicated between receiver 40 and bayonet 38. In the illustrated embodiment the number of air passageways is four. However, it will be understood by one skilled in the art that any number of air passageways can be defined. As shown in FIG. 3, the air outlet holes 84a–d are defined by a flexible boot 81 that fits into receiver 40. Flexible boot 40 may be of the same type as the flexible boot disclosed in commonly assigned U.S. Pat. No. 5,782,571, the disclosure of which is hereby incorporated herein by reference. Flexible boot 81 may be made of any flexible polymeric or rubber material, such as, for example, rubber, neoprene, urethane, or other suitable material. The flexibility of boot 81 allows boot 81 to move out of the way of bayonet 38 when it is being inserted into channel 42 and then return to its original shape to thereby ensure an airtight connection between receiver 40 and bayonet 38.

An electrical connector 88 is positioned in a recess 90 defined in one of sidewalls 58 (FIG. 3). Electrical connector 88 includes a bottom flange 92 which fits into a corresponding bottom groove 94 defined in recess 90. The cooperation of bottom flange 92 and bottom groove 94 prevents electrical connector 88 from moving vertically within recess 90. Electrical connector 88 is prevented from being removed from recess 90 by a pair of electrical connector screws 96. Electrical connector screws 96 fit into a pair of screw apertures 98 defined in outside surface 60 of receiver body 54. While not shown, electrical connector screws 96 are externally threaded and screw apertures 98 are internally threaded such that screws 96 are threadedly retained in apertures 98. The head of screws 96 are of an enlarged diameter which overlaps at least a portion of electrical connector 88 and thereby prevents its removal from recess 90 (FIG. 6). In the illustrated embodiment, electrical connector 88 includes five electrical pins 100 which are electrically coupled to five corresponding electrical pins on bayonet 38 when bayonet 38 is inserted into receiver 40. The five-pin electrical connection is a standard-type of connection and can be replaced with either a three-pin connection or any other type of connection having any number of electrical pins. Electrical connector 88 receives power via a plug 89 to which an electrical power supply cable is attached (not shown). Plug 89 will have the same number of pins or receptacles as there are electrical pins 100.

When bayonet 38 is inserted into channel 42 of receiver 40, it is secured therein by way of lock 52. In the illustrated embodiment, lock 52 generally includes a handle 36, an end structure 104, a shaft 106, and a latch 108 (FIG. 3). Shaft 106 extends through a horizontal shaft aperture 110 defined in receiver body 54. A bushing 112 is placed around either end of shaft 106 and allows shaft 106 to rotate within shaft aperture 110. Latch 108 of lock 52 is positioned along shaft 106 such that it will fit in an opening 114 in bottom plate 56. Shaft 106 generally includes a smooth exterior surface 116 except for a hexagonal middle portion 118 to which latch 108 is secured. Specifically, latch 108 includes an interior, hexagonal bore which matingly receives hexagonal middle portion 118 of shaft 106.

Figure 7:
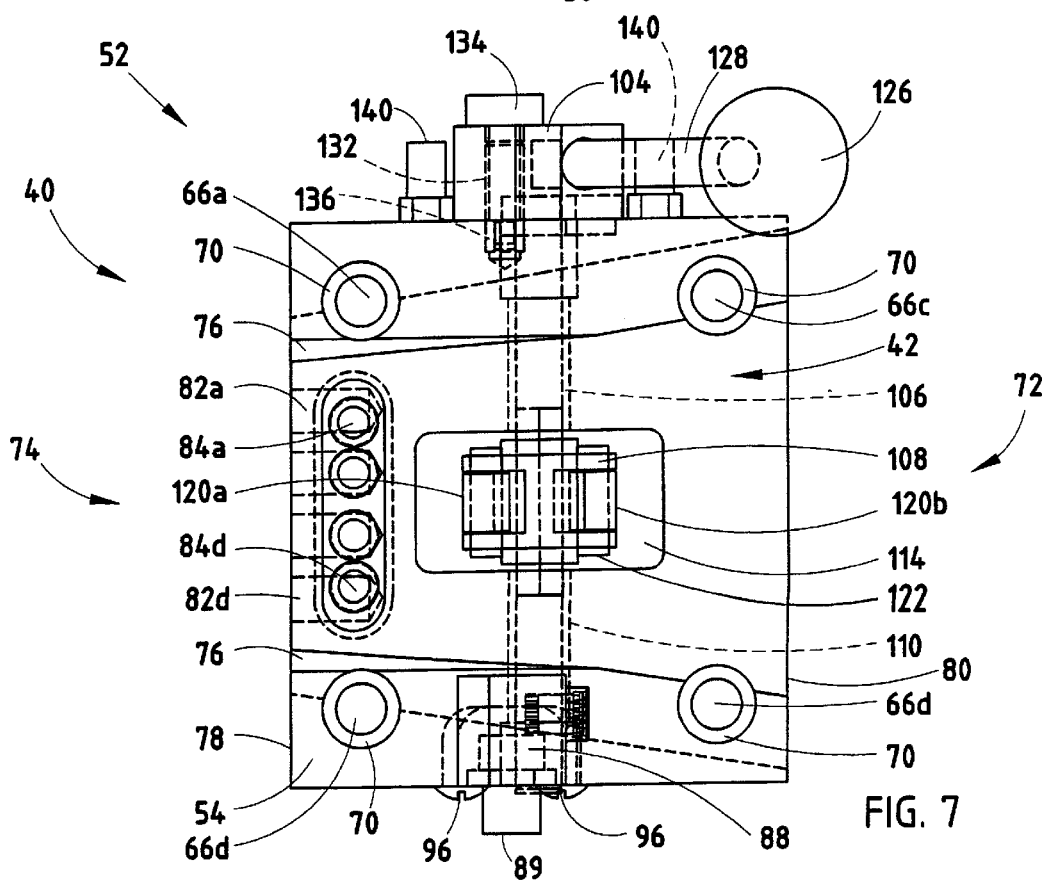
FIG. 7 is a plan view of the receiver.

Latch 108 includes a first and second roller 120a, b (FIGS. 6–7). The first latch roller 120a is positioned in front of shaft 106 and second latch roller 102b is positioned behind shaft 106. Latch rollers 120a, b are rotatably mounted on pins 122. The pins 122 are, in turn, mounted to a latch body 124. When shaft 106 rotates, latch body 124 will rotate. By rotating shaft 106 in different directions, latch 108 will either retain or partially expel bayonet 38 from receiver 40 as will be described more fully herein.

Handle 36 of lock 52 is secured to end structure 104 which is, in turn, secured to the end of shaft 106. Handle 36 includes a handle knob 126 and handle shaft 128 connected thereto. The bottom end of handle shaft 128 abuts against a flat surface 130 of shaft 106. When handle 36 is moved forward or backward, the handle thereby causes shaft 106 to rotate. End structure 104 further includes a retractable locking pin 132 that extends outwardly from end structure 104 toward receiver body 54. Locking pin 132 is illustrated in its extended position and can be retracted into end-structure 104 in a direction generally away from receiver body 54. The retraction of locking pin 132 is controlled by a locking knob 134 located on the other side of end-structure 104. When locking knob 134 is pulled in a direction generally away from receiver body 54, locking pin 132 retracts into end structure 104. A spring (not shown) is disposed inside of end structure 104 and biases locking pin 132 toward the extended position. When locking pin 132 is in its extended position, it extends into an aperture 136 defined in receiver body 54 (FIG. 7). A bushing 138 is also positioned in aperture 136 and receives locking pin 32. When locking pin 32 extends into aperture 136, handle 36 is prevented from rotating. Handle 36 can only be rotated by pulling locking knob 134 in a direction away from receiver body 54 to thereby retract locking pin 132. When locking pin 132 is retracted, handle 36 is free to rotate shaft 106. The rotation of handle 36 and shaft 106 is limited by a pair of stopping pins 140 secured in outside surface 60 of receiver body 54.

End structure 104 includes a cylindrical opening 142 in which shaft 106 is received (FIG. 3). A torsion spring (not shown) is disposed within cylindrical opening 142 and is oriented to bias handle 36 toward the unlocked position. The unlocked position is the forward most position for handle 36 and is the opposite to what is shown in the figures. One end of the torsion spring fits into a groove 144 defined in end-structure 104. The other end of the torsion spring is positioned within receiver body 54.

Figure 4:
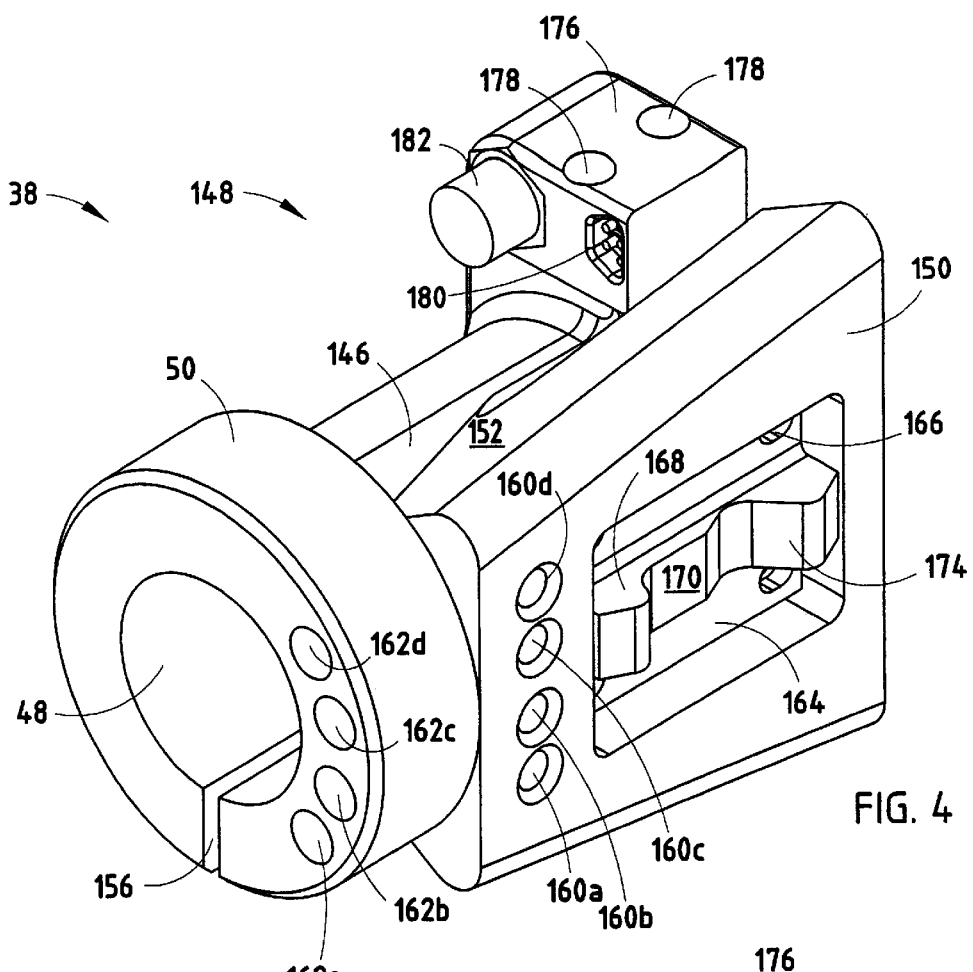
FIG. 4 is a perspective view of the underside of the bayonet.
Figure 5:
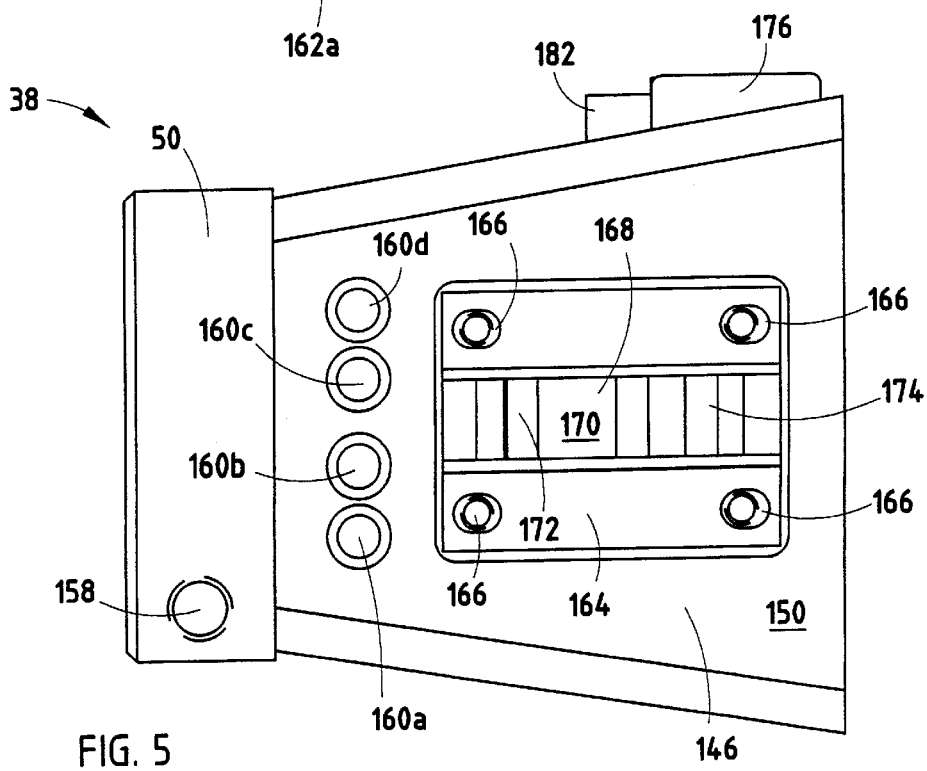
FIG. 5 is a plan view of the underside of the bayonet.

Bayonet 38, which receives boom 26 in bore 48, includes a body 146 having a top 148 and a bottom 150 (FIGS. 1 and 4–5). Bayonet body 146 includes a pair of tapered surfaces 152 that engage inside surfaces 64 of receiver sidewalls 58 when bayonet 38 is inserted into receiver 40. The bore 48 of bayonet 38 is generally divided into two parts: the head portion 50 and a rear portion 154. The rear portion 154 of bore 48 has a fixed diameter, while the diameter of head portion 50 can be decreased in order to grip boom 26. The decrease in diameter of head portion 50 is accomplished by way of a space 156 that interrupts the circular shape of head portion 50. By reducing space 156, the diameter of head portion 50 can be reduced to thereby tightly grip boom 26. The size of space 156 is controlled by a screw or bolt (not shown) that is inserted through a tightening aperture 158 defined in head portion 50 (see FIG. 5). Tightening aperture 158 is at least partially threaded and is adapted to receive a threaded fastener. Rotation of the threaded fastener squeezes together head portion 50 such that space 156 is reduced. Boom 26 is thereby secured to bayonet 38 and can only be removed when the fastener is loosened. As shown in the illustrated embodiment, space 156 is oriented horizontally while tightening aperture 158 extends vertically. It will be understood by one skilled in the art that space 156 could be oriented vertically with tightening aperture 158 oriented horizontally. Off-vertical and off-horizontal orientations are also possible.

Bottom 150 of bayonet 38 further includes a plurality of air inlet holes 160a–d which define the openings to air passageways that extend into bayonet body 146 and exit out a plurality of air outlet holes 162a–d defined in the front of head portion 50. Air inlet holes 160a–d and air outlet holes 162a–d are therefore in respective fluid communication. Air holes 160a–d align with and are in fluid communication with, air holes 84a–d on bottom plate 56 of receiver 40 when bayonet 38 has been inserted on top of receiver 40.

Figure 8:
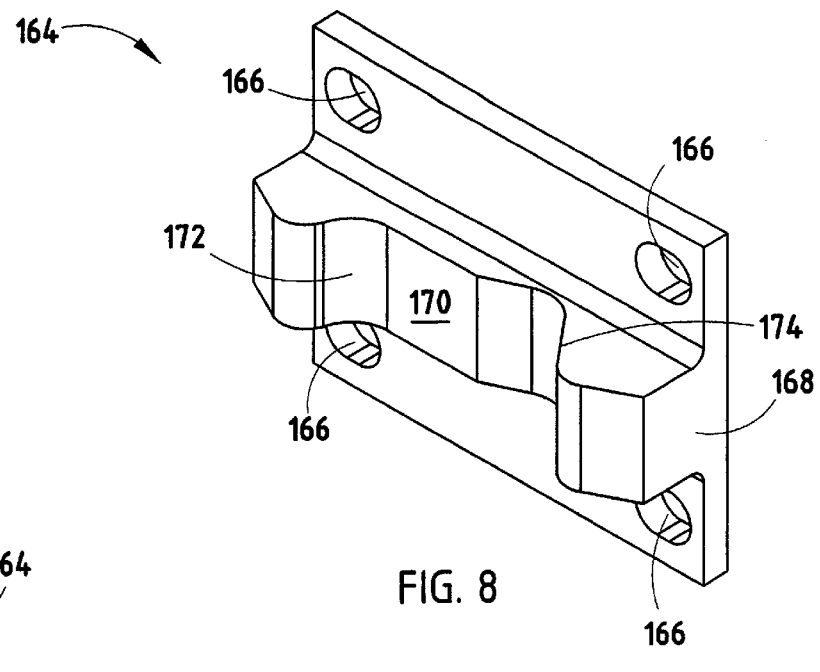
FIG. 8 is a perspective view of a locking plate of the bayonet.
Figure 9:
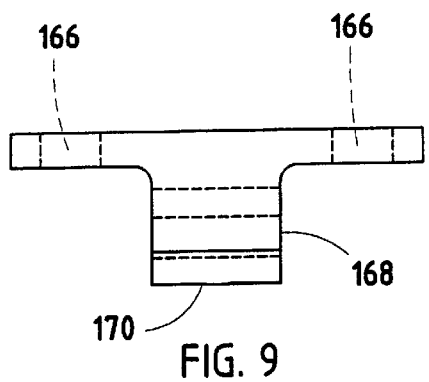
FIG. 9 is an end view of the locking plate of FIG. 8.
Figure 10:
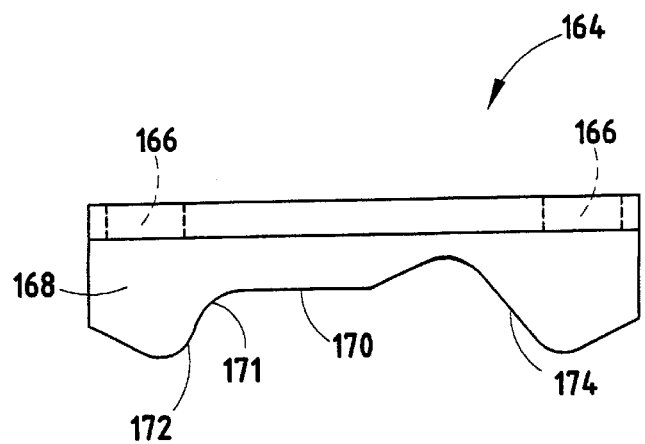
FIG. 10 is a side view of the locking plate of FIG. 8.

Bayonet 38 further includes a locking plate 164 secured to bottom 150 by way of four fasteners inserted through four apertures 166 defined in locking plate 164 (FIGS. 5, 8, and 9). In the current embodiment, apertures 166 are somewhat elongated to allow the precise positioning of locking plate 164 on bayonet 38 to be varied when a cylindrical fastener is inserted through apertures 166. After locking plate 164 has been placed in the desired position, the fasteners in apertures 166 are tightened and locking plate 164 is thereby secured to bayonet 38 at the desired location. Locking plate 164 includes a central, raised structure 168 that includes a bottom surface 170 (FIGS. 8–10). Bottom surface 170 includes a front cam surface 172 and a rear cam surface 174. Front and rear cam surfaces 172 and 174 engage latch rollers 120a, b of latch 108 in order to lock and unlock bayonet 38 to receiver 40. In particular, first latch roller 120a contacts front cam surface 172 when lock 52 is in a locking position that secures bayonet 38 to receiver 40. When front latch roller 120a contacts front cam surface 172, latch roller 120a prevents bayonet 38 from being slid backward out of channel 42 of receiver 40. First latch roller 120a also exerts a forward force against front cam surface 172 that helps push bayonet 38 forwardly into receiver 40, when lock 52 is moved to the locking position. This helps insure a tight connection between bayonet 38 and receiver 40.

Front cam surface 172 also includes a detent 171 which is depicted in enlarged size in FIG. 10 for clarity. Detent 171 provides a seat in which front latch roller 120a sits when lock 52 is in the locking position. The seat provided by detent 171 helps prevent front latch roller 120a from rolling downward along front cam surface 172 on its own accord. Instead, the user must affirmatively move handle 36 to the unlocking position in order to move front latch roller 120a out of detent 171. Detent 171 and front cam surface 172 also help ensure a tight fit between bayonet 38 and receiver 40 when the two are locked together. If a rearward force is exerted against bayonet 38 while it is locked in receiver 40, detent 171 and the curved surface of front cam surface 172 will cause an upwardly directed force to be exerted on front latch roller 120a. This upward force on front latch roller 120a will push bayonet 38 upwardly against sidewalls 58 and thereby create a tighter fit between bayonet 38 and receiver 40.

When lock 52 is moved to an unlocking position, shaft 106 rotates such that first latch roller 120a has moved out of contact with front cam surface 172. First latch roller 120a therefore does not prevent bayonet 38 from being slid rearwardly out of receiver 40. In fact, when lock 52 is moved to the complete unlocking position, second latch roller 120b will be rotated into contact with rear cam surface 174. As second latch 120b is rotated into contact with rear cam surface 174, second latch roller 120b will exert a rearward force against rear cam surface 174 that will help push bayonet 38 at least partially out of receiver 40.

Bayonet 38 further includes an electrical connector 176 secured thereto by way of a pair of fasteners (not shown) inserted through fastening apertures 178 (FIG. 3). Electrical connector 176 includes a contact area 180 which electrically couples with electrical pins 100 on receiver 40 when bayonet 38 is inserted into receiver 40. A plug 182 on electrical connector 176 is provided and receives a cable (not shown) that delivers electrical power to one or more of the tools supported on boom 28. As noted earlier, the number of pins in receiver electrical connector 88 is five in the illustrated embodiment, but can be varied. Contact area 180 of bayonet electrical connector 176 will have a corresponding number of receptacles to receive however many pins are present on receiver electrical connector 88.

When in use, boom 26 is first inserted into bore 48 of bayonet 38. The boom 26 is secured therein by tightening a fastener in tightening aperture 158 of head portion 50 of bayonet 38. The boom 26 includes whatever configuration of tools that are mounted thereto, such as the shovel bracket 30 of FIG. 11. Bayonet 38, with boom 26 and all its associated tools attached, is then slid into receiver 40 and locked in place. When the time comes to change the tool configuration on a transfer press rail, bayonet 38 and the attached tool assembly are removed. This is accomplished by pushing locking handle 36 in a forward direction (after locking pin 132 has been retracted). The forward movement of locking handle 36 causes second latch roller 120b to partially push bayonet 38 rearwardly out of receiver 40. The user then pulls boom 26 and the attached tool assembly in a rearward direction until bayonet 38 is completely receivered from receiver 40. A new bayonet 38 with an attached boom and tool assembly can then be inserted into receiver 40 by pushing the bayonet 38 forwardly into receiver 40. The locking handle 36 is then pulled rearwardly until bayonet 38 has been fully inserted into receiver 40 and is locked therein by lock 52.

In the current embodiment, receiver 40 and bayonet 38 are both made of aluminum. It will be understood, of course, that a variety of different materials can be used within the scope of the invention. In the current embodiment, latch 108 includes a first and second roller 120 a, b. It will be understood that latch 108 could alternatively be manufactured of a solid piece of material, such as bronze, or other suitable material, that slidingly engages front and rear cam surfaces 172 and 174, when shaft 106 is rotated.

It will also be understood that the arrangement of locking pin 132 within end structure 104 and receiver 40 can be varied in a number of ways. For example, locking pin 132 alternatively can be retractably attached to receiver 40 such that knob 134 will push locking pin 132 into receiver 40 when knob 134 is moved in a direction toward receiver 40.

It will be further understood by one skilled in the art that the present invention is not limited to the particular preferred embodiments discussed in the foregoing specification, but includes any and all such modifications that are within the spirit and scope of the present invention as defined in the appended claims The embodiments of the present invention in which an exclusive property or privilege is claimed are defined as follows:

1. A transfer press tool mounting system comprising:
    a bayonet defining an opening for selectively receiving a boom, said boom adapted to support one or more tools that are used to manipulate items being pressed by said transfer press;
    a receiver having a front end and a back end, said receiver defining a channel for selectively receiving said bayonet, said channel having a width that decreases from either said back end to said forward end or from said forward end to said back end;
    a transfer press rail upon which said receiver is mounted; and
    a lock attached to one of said bayonet and receiver, said lock movable between an unlocking position in which said bayonet can be removed from said receiver and a locking position in which said bayonet cannot be removed from said receiver.

2. The transfer press tool mounting system of claim 1 wherein said receiver and said bayonet each include at least one air passageway, said air passageway of said receiver and said air passageway of said bayonet being in communication when said bayonet is inserted into said channel of said receiver.

3. The transfer press tool mounting system of claim 1 wherein said receiver and said bayonet each include an electrical connector, said bayonet electrical connector being coupled to said receiver electrical connector when said bayonet is inserted into said channel of said receiver.

4. The transfer press tool mounting system of claim 1 wherein said receiver includes a body having a bottom plate and two sidewalls, said channel being defined by said bottom plate and said two sidewalls.

5. The transfer press tool mounting system of claim 4 wherein said two sidewalls extend upwardly from said bottom plate at an angle toward each other.

6. The transfer press tool mounting system of claim 1 wherein said receiver defines a plurality of holes for receiving fasteners for securing said receiver to said transfer press rail.

7. The transfer press tool mounting system of claim 4 wherein said lock includes a shaft rotatably disposed in said body of said receiver, said lock including a latch which selectively extends upwardly out of said bottom plate and prevents removal of said bayonet from said channel of said receiver.

8. The transfer press tool mounting system of claim 7 wherein said latch includes a first and a second end, said first end of said latch selectively engageable with said bayonet to prevent said bayonet from being removed from said channel of said receiver, said second end of said latch selectively engageable with said bayonet to push said bayonet at least partially out of said channel of said receiver.

9. The transfer press tool mounting system of claim 1 wherein said lock exerts a force on said bayonet in a direction toward the end of the channel with a decreased width when said lock is in said locking position.

10. A transfer press tool mount comprising:
  a bayonet having a front end in which an opening is defined for selectively receiving a boom, said boom adapted to support one or more tools that are used to manipulate items being pressed by said transfer press, said boom adapted to support said tools in front of said bayonet;
  a receiver having a forward end and a back end, said receiver defining a channel for selectively receiving said bayonet, said receiver including at least one wall which prevents said bayonet from being inserted into said forward end of said channel such that said front of said bayonet must be inserted into said back end of said channel in order to secure said bayonet to said receiver, whereby said bayonet is moved toward said back end of said receiver when said bayonet is to be removed from said receiver; and
  a lock attached to one of said bayonet and receiver, said lock movable between an unlocking position in which said bayonet can be removed from said receiver and a locking position in which said bayonet cannot be removed from said receiver.

11. The transfer press tool mount of claim 10 wherein said channel is defined by a pair of spaced sidewalls and a bottom plate, the space between said pair of sidewalls decreasing from said back end toward said forward end of said channel.

12. The transfer press tool mount of claim 11 wherein said receiver and said bayonet each include at least one air passageway, said air passageway of said receiver and said air passageway of said bayonet being in communication when said bayonet is inserted into said channel of said receiver.

13. The transfer press tool mount of claim 10 wherein said receiver and said bayonet each include an electrical connector, said bayonet electrical connector being coupled to said receiver electrical connector when said bayonet is inserted into said channel of said receiver.

14. The transfer press tool mount of claim 11 wherein said pair of sidewalls extend upwardly from said bottom plate at an angle toward each other.

15. The transfer press tool mount of claim 10 wherein said receiver defines a plurality of holes for receiving fasteners for securing said receiver to a transfer press rail.

16. The transfer press tool mount of claim 10 wherein said lock includes a shaft rotatably disposed in said body of said receiver, said lock including a latch which selectively extends upwardly out of said bottom plate and prevents removal of said bayonet from said channel of said receiver.

17. The transfer press tool mount of claim 16 wherein said latch includes a first and a second end, said first end of said latch selectively engageable with said bayonet to prevent said bayonet from being removed from said channel of said receiver, said second end of said latch selectively engageable with said bayonet to push said bayonet at least partially out of said channel of said receiver.

18. The transfer press tool mount of claim 12 wherein said air passageway of said receiver is defined in said bottom plate and said air passageway of said bayonet is defined on an underside of said bayonet.

19. A transfer press tool mount comprising:
  a bayonet having an opening for selectively receiving a boom;
  a receiver having at least two spaced sidewalls and a bottom plate, said bottom plate having a top surface that generally defines a plane, said spaced sidewalls and bottom plate defining in combination a channel for selectively receiving said bayonet; and
  a lock attached to said receiver, said lock selectively preventing said bayonet from being removed from said receiver, said lock including a latch attached to a shaft such that said latch selectively extends into the channel from the bottom plate when the shaft is rotated, said shaft being located underneath said plane and having a longitudinal axis that is substantially parallel to said plane.

20. The transfer press tool mount of claim 19 wherein said latch of said lock includes a first end that extends into said channel when said shaft is rotated in a first direction, and a second end that extends into said channel when said shaft is rotated in a second direction, said first end of said latch pushing said bayonet at least partially out of said receiver when said first end extends into said channel, said second end of said latch preventing removal of said bayonet from said receiver.

21. The transfer press tool mount of claim 20 wherein said sidewalls are tapered such that a width of said channel decreases from a first end of said channel to a second end of said channel.

22. The transfer press tool mount of claim 21 wherein said bayonet includes a first and a second cam surface, said first end of said latch pushing said first cam surface in a direction toward said first end of said channel when said latch engages said first cam surface, said second end of said latch pushing said second cam surface in a direction toward said second end of said channel when said latch engages said second cam surface.

23. The transfer press tool mount of claim 22 wherein said first and second ends of said latch each include a roller.

24. The transfer press tool mount of claim 21 wherein said sidewalls extend upwardly from said bottom plate at an angle.

25. The transfer press tool mount of claim 21 wherein said width of said channel decreases from back end of said receiver to a front end of said receiver such that said bayonet is inserted into said receiver from said back end of said receiver.

26. The transfer press tool mount of claim 19 further including an electrical connector on each of said bayonet and said receiver, said electrical connectors making electrical contact when said bayonet is inserted into said receiver.

27. The transfer press tool mount of claim 19 wherein said receiver and said bayonet each define at least one air passageway, said air passageway of said receiver being in communication with said air passageway of said bayonet when said bayonet is inserted into said receiver.

28. The transfer press tool mount of claim 22 wherein said latch is of a single-piece construction and said first and second ends of said latch slidingly engage said first and second cam surfaces.

29. The transfer press tool mount of claim 22 further including a detent defined in said second cam surface.

* * * * *